United States Patent
Ruengeler et al.

(10) Patent No.: US 12,480,991 B2
(45) Date of Patent: Nov. 25, 2025

(54) ELECTRONIC DEVICE FOR IMPROVING A PERFORMANCE OF A SIGNAL CHAIN

(71) Applicant: Rohde & Schwarz GmbH & Co. KG, Munich (DE)

(72) Inventors: Matthias Ruengeler, Munich (DE); Michael Simon, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 386 days.

(21) Appl. No.: 18/333,207

(22) Filed: Jun. 12, 2023

(65) Prior Publication Data

US 2024/0410942 A1    Dec. 12, 2024

(51) Int. Cl.
| | | |
|---|---|---|
| H04B 17/00 | (2015.01) | |
| G01R 31/317 | (2006.01) | |
| H04B 17/21 | (2015.01) | |
| H04B 17/29 | (2015.01) | |

(52) U.S. Cl.
CPC ......... *G01R 31/3172* (2013.01); *H04B 17/21* (2015.01); *H04B 17/294* (2023.05)

(58) Field of Classification Search
CPC ...... H04B 17/21; H04B 17/101; H04B 17/11; H04B 17/201; H04B 17/22; H04B 17/29; H04B 17/294; H04B 17/336
See application file for complete search history.

(56) References Cited

U.S. PATENT DOCUMENTS

| | | | | |
|---|---|---|---|---|
| 6,927,591 B2 * | 8/2005 | McCord | ........... | G01R 31/31924 324/755.05 |
| 7,235,982 B1 * | 6/2007 | Shoulders | .............. | G01R 27/28 324/638 |
| 7,765,449 B2 * | 7/2010 | Doi | .................... | G11C 16/0483 714/719 |
| 11,366,193 B2 | 6/2022 | Ramian et al. | | |

* cited by examiner

*Primary Examiner* — Tuan Pham
(74) *Attorney, Agent, or Firm* — CHRISTENSEN O'CONNOR JOHNSON KINDNESS PLLC

(57) ABSTRACT

An electronic device for improving a performance of a signal chain is described. The signal chain includes multiple electronic components. The electronic device further includes a control circuit. The control circuit is configured to receive a set of figures of merit, wherein the set of figures of merit includes at least one component-specific figure of merit for several different settings of several of the electronic components, respectively. The control circuit is configured to determine and/or receive at least one n-th moment characteristic of a signal of the signal chain. The control circuit is configured to determine at least one performance parameter for a plurality of different combinations of settings of the electronic components, respectively, wherein the at least one performance parameter is indicative of a performance of the signal chain. The control circuit is configured to determine the at least one performance parameter based on the set of figures of merit and based on the at least one n-th moment characteristic. The control circuit is configured to select a combination of settings of the electronic components based on the performance parameters determined for different (Continued)

combinations of settings of the electronic components. Further, a configuration method of configuring a signal chain is described.

22 Claims, 3 Drawing Sheets

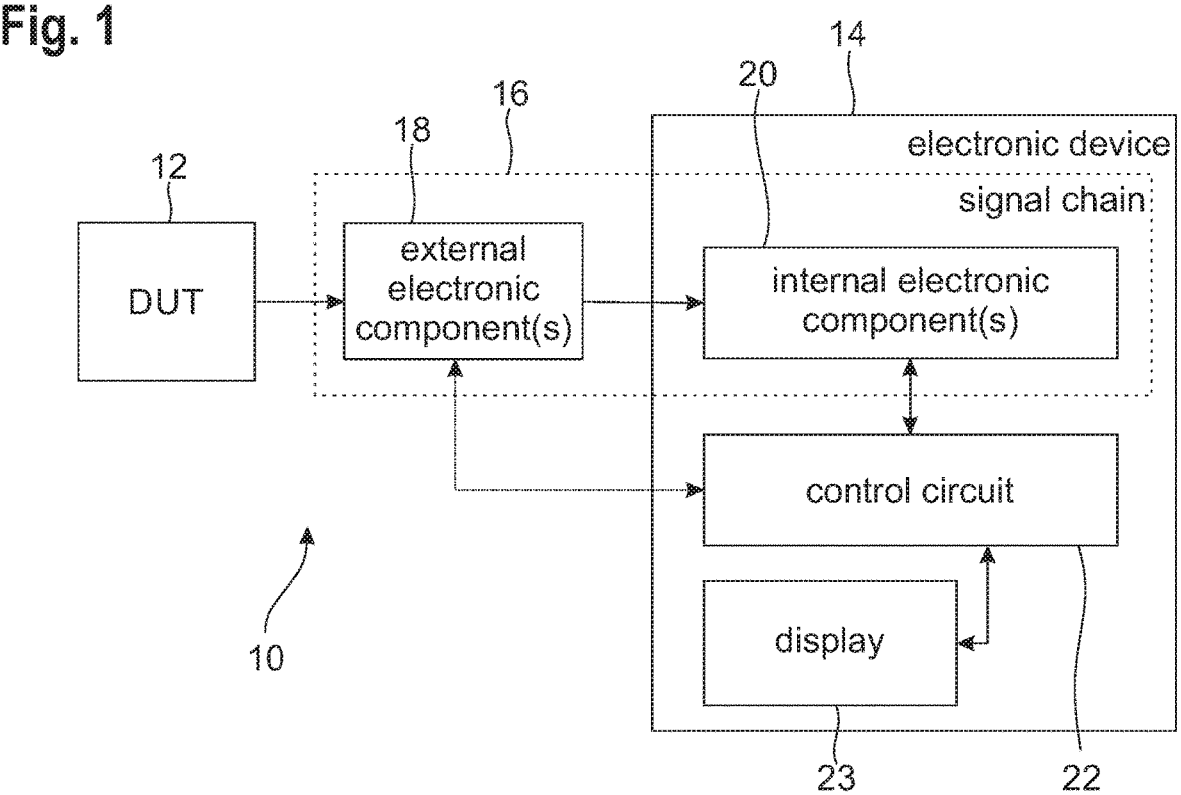
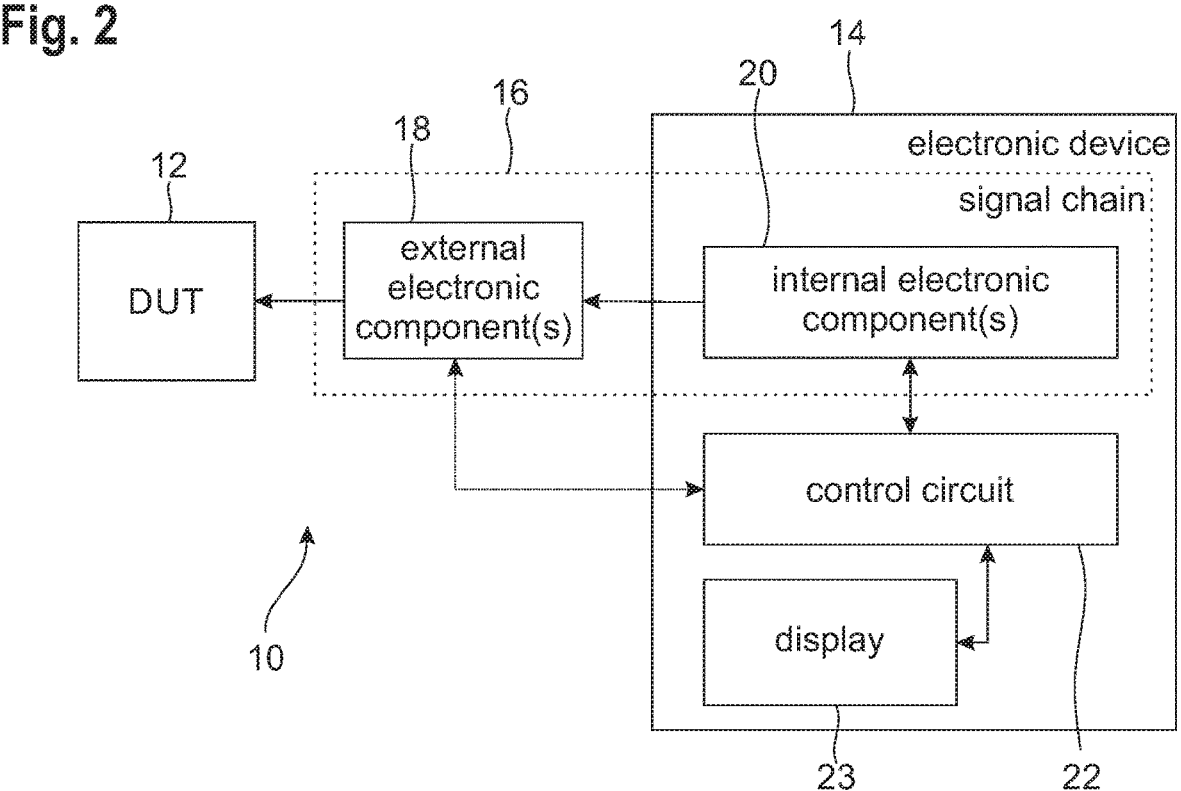

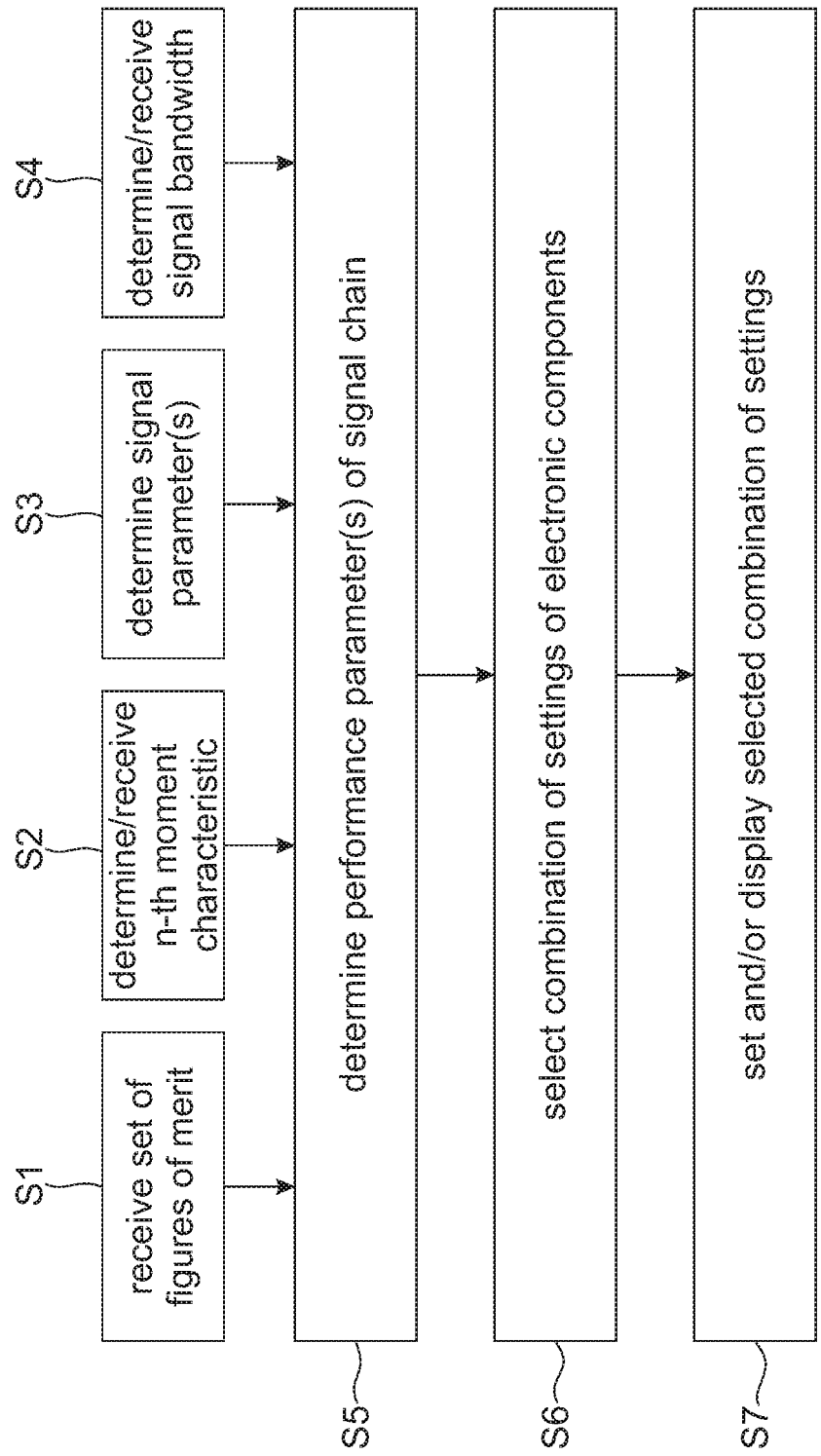

ELECTRONIC DEVICE FOR IMPROVING A PERFORMANCE OF A SIGNAL CHAIN

FIELD OF THE DISCLOSURE

Embodiments of the present disclosure generally relate to an electronic device for improving a performance of a signal chain. Embodiments of the present disclosure further relate to a configuration method of configuring a signal chain by an electronic device.

BACKGROUND

An important task for manufacturers of test and measurement instruments is empowering the customer to use a measurement instrument at its best performance.

As the complexity of measurements grows, an abundance of operational parameters of signal chains used for performing the measurements influence the performance of the signal chain and thus the performance of the measurement instrument.

Usually, these operational parameters have to be tuned by hand in order to optimize the performance of the measurement instrument, which is rather time-consuming and may overwhelm even experienced users due to the complexity of the available settings.

Thus, there is a need for an electronic device as well as a configuration method that allow for improving the performance of a signal chain in an easier and more efficient manner.

SUMMARY

Embodiments of the present disclosure provide an electronic device for improving a performance of a signal chain. The signal chain comprises multiple electronic components, wherein the electronic components are integrated into the electronic device and/or are an external electronic component, respectively. In an embodiment, the electronic device comprises a control circuit configured to receive a set of figures of merit, wherein the set of figures of merit comprises at least one component-specific figure of merit for several different settings of several of the electronic components, respectively. The control circuit is also configured to determine and/or receive at least one n-th moment characteristic of a signal of the signal chain. The control circuit is further configured to determine at least one performance parameter for a plurality of different combinations of settings of the electronic components, respectively, wherein the at least one performance parameter is indicative of a performance of the signal chain. The control circuit is further configured to determine the at least one performance parameter based on the set of figures of merit and based on the at least one n-th moment characteristic. The control circuit is also configured to select a combination of settings of the electronic components based on the performance parameters determined for different combinations of settings of the electronic components.

Therein and in the following, the term "external electronic component" is understood to denote an electronic component that is established separately from the electronic device. For example, the external electronic component(s) may be connected to an input and/or to an output of the electronic device.

In some embodiments, the multiple electronic components may comprise an amplifier, a filter, for example a dither filter, a mixer, an analog-to-digital converter (ADC), a digital-to-analog converter (DAC), an RF frontend, a preamp, a mechanical attenuator, an electrical attenuator, a detector, and/or a signal generator. These electronic components may be integrated into the electronic device and/or may be external electronic components. However, it is to be understood that the multiple electronic components may comprise any other suitable electronic components, for example depending on the type of measurements to be conducted.

The term "n-th moment characteristic" should be understood to denote the n-th statistical moment of the signal of the signal chain, for example the n-th statistical moment of the amplitude of the signal of the signal chain.

Generally, the signal of the signal chain may relate to a signal processed by the signal chain, e.g. obtained at the end of the signal chain or within the signal chain. However, the signal of the signal chain may also relate to a signal received by the signal chain, e.g. received at an input port or a user port. For instance, a second moment could be measured at the user/input port by a power meter, e.g., not at an end of the signal chain or within the signal chain (after some processing).

Accordingly, the 2nd moment characteristic of the signal may correspond to the power level of the signal. In some embodiments, the n-th moment may be an estimate of the probability distribution of the power of the signal of the signal chain.

The term "performance parameter" should be understood to denote a parameter that is indicative of an unwanted influence of the electronic components on measurements conducted by the signal chain. For example, the at least one performance parameter may be indicative of noise generated by the electronic components and/or non-linear distortions, which may limit the precision of certain measurements such as measurements of the error vector magnitude (EVM) of a device under test and/or of the adjacent channel leakage ratio (ACLR) of a device under test.

In general, the present disclosure is based on the idea to provide an electronic device that is capable of automatically setting the electronic components (or at least of automatically providing the corresponding settings of the electronic components to a user), such that the performance of the signal chain is optimized.

Therein, the control circuit takes the individual component-specific figures of merit into account for determining the at least one performance parameter. In other words, the figures of merit of the individual electronic components are considered rather than an overall figure of merit for the complete signal chain. This way, the at least one performance parameter can be determined with enhanced precision.

Thus, the at least one performance parameter is determined with high precision for a plurality of different combinations of settings of the electronic components, for example for all possible combinations of settings of the electronic components.

Accordingly, if only one performance parameter is determined, an optimal combination of settings of the electronic components can be selected by selecting the combination being above or below a certain threshold or having an optimal (i.e. maximal or minimal) performance parameter.

If at least two performance parameters are determined, an optimal combination of settings of the electronic components can be selected by weighting the at least two performance parameters with a suitable weighting factor, wherein the weighting factor may depend on the measurement to be conducted.

In some embodiments, the at least one performance parameter may be indicative of an EVM caused by the signal chain and/or of an ACLR caused by the signal chain. Thus, the selected combination of settings may be a combination that minimizes the (unwanted) contribution of the signal chain to the EVM and/or to the ACLR.

The control circuit may be configured to automatically set the electronic components according to the selected combination of settings.

Alternatively or additionally, the control circuit may be configured to provide information on the selected combination of settings to a user, e.g. by displaying the information on the selected combination of settings on a display, for example on a display of the electronic device. Thus, the user is enabled to set the respective electronic components based on the information provided, thereby reducing the time and expertise necessary for setting the components.

According to an aspect of the present disclosure, the at least one performance parameter comprises, for example, a signal-to-noise and distortion ratio (SINAD) being associated with predetermined portions of the signal of the signal chain. In general, the predetermined portions of the signal that are taken into account for determining the at least one performance parameter may depend on the type of the measurement to be conducted by the signal chain.

For instance, the predetermined portions of the signal relate to bursts of the signal.

For example, if unwanted contributions of the electronic components to the EVM are to be reduced, the complete signal of the signal chain may be taken into account. This way, the determined SINAD is indicative of the contribution of the signal chain to the EVM.

As another example, if unwanted contributions of the electronic components to the ACLR are to be reduced, only shoulder portions of the signal of the signal chain may be taken into account, for example wherein a number of carriers, a carrier distance, and/or a modulation scheme (such as OFDM) may be taken into account. This way, the determined SINAD is indicative of the contribution of the signal chain to the ACLR.

In an embodiment of the present disclosure, the control circuit is configured to neglect predetermined portions of the signal of the signal chain for determining the at least one performance parameter. In other words, only portions of the signal of the signal chain may be taken into account that are actually relevant for determining the at least one performance parameter.

For example, if the ACLR caused by the signal chain is to be reduced, portions of the signal of the signal chain that do not correspond to shoulder portions may be neglected.

As another example, a pilot signal comprised in the signal of the signal chain may be neglected, such that only a payload portion of the signal of the signal chain may be considered for determining the at least one performance parameter.

In a further embodiment of the present disclosure, the control circuit is configured to adapt the n-th moment used for determining the at least one performance parameter. For example, the control circuit may be configured to determine the at least one performance parameter based on the second moment of the signal of the signal chain and/or based on the fourth moment of the signal of the signal chain. It has turned out that the precision of determining the at least one performance parameter can be further enhanced if both the second and the fourth moment are considered for determining the at least one performance parameter.

Another aspect of the present disclosure provides that the at least one figure of merit comprises, for example, at least one of a noise figure, a third order intercept, or a gain of the respective electronic component. However, it is to be understood that any other suitable figure of merit may be used.

In some embodiments, the electronic device comprises a detector being configured to determine at least one signal parameter of the signal of the signal chain, wherein the at least one signal parameter is associated with at least one component-specific requirement of at least one of the electronic components, and wherein the control circuit is configured to take the at least one signal parameter into account for determining the at least one performance parameter.

In some embodiments, the detector may be established as a physical detector and/or as a virtual detector. Such a virtual detector is, for example, described in U.S. Pat. No. 11,137,444 B2, which is hereby incorporated in its entirety by reference.

For example, the at least one signal parameter comprises a headroom of an analog-to-digital converter, a headroom of a digital-to-analog converter, a saturation of an analog-to-digital converter, a saturation of a digital-to-analog converter, an overload of an analog-to-digital converter, and/or an overload of a digital-to-analog converter. However, it is to be understood that the at least one signal parameter may relate to any other component-specific requirement.

The electronic device is configured to determine signal performance metrics, e.g. EVM and/or ACLR. The control circuit is configured to take the signal performance metrics into account for determining the at least one performance parameter. Hence, a standard measurement for obtaining an optimal EVM may be tried, but with a model assisted in order to provide information which measurements to conduct and refine the model for an optimal setting.

The electronic device may be configured to estimate a bandwidth of the signal of the signal chain. Alternatively or additionally, the electronic device comprises a user interface that is configured to receive the bandwidth from a user. In other words, the electronic device, for example the control circuit, may be configured to automatically determine the bandwidth of the signal of the signal chain, for example based on the signal of the signal chain. Alternatively or additionally, a user may input the bandwidth of the signal of the signal chain via the user interface.

According to an aspect of the present disclosure, the control circuit, for example, is configured to determine the at least one performance parameter based on the bandwidth. In some embodiments, knowing the bandwidth of the signal, the n-th moment characteristic, for example the power level of the signal, and the individual component-specific figures of merit, for example the component-specific noise figures and/or third order intercepts, textbook formulas can be used to estimate or determine the at least one performance parameter, for example the SINAD.

In an embodiment of the present disclosure, the control circuit is configured to take a noise reduction technique applied to the signal of the signal chain into account for determining the at least one performance parameter. In some embodiments, an impact of the noise reduction technique on noise generated by the individual electronic components may be estimated and taken into account for determining the at least one performance parameter.

In some embodiments, figures of merit other than the total noise figure of the individual components may be weighted with a greater weighting factor if a noise reduction technique is applied to the signal of the signal chain. In other words the control circuit may focus on figures of merit other than the total noise figure is a noise reduction technique is applied.

For example, the noise reduction technique may be a cross-correlation noise canceling technique or an IQ noise canceling technique, for example an IQ averaging technique.

In some embodiments, any suitable noise reduction technique known in the state of the art may be used.

In some embodiments, selecting a combination of settings of the electronic components based on the performance parameters comprises configuring the noise reduction technique. Actually, configuring the noise reduction technique means turning on or turning off the noise reduction technique, e.g. enabling or disabling the noise reduction technique, but also change noise reduction technique parameters (e.g. number of averages). For example, for low-power signals, other settings may be more important than applying noise reduction to the signal, for example settings of a preamp. In this case, the noise reduction technique may be turned off.

According to a further aspect of the present disclosure, the control circuit, for example, is configured to take an equalization technique applied to the signal of the signal chain into account for determining the at least one performance parameter, wherein the equalization technique is a technique for compensating non-linearities of the electronic components. In some embodiments, an impact of the equalization technique contributions of the individual electronic components to the at least one performance parameter may be estimated and taken into account for determining the at least one performance parameter.

In some embodiments, the equalization technique may relate to pre-compensating non-linearities and/or post-compensating non-linearities of the electronic components by a corresponding equalizer filter circuit.

In some embodiments, the electronic device may comprise a user interface, wherein the user interface is configured to receive the at least one figure of merit of external electronic components of the signal chain from a user.

However, it is also conceivable that the at least one figure of merit of the external electronic components is automatically transmitted from the respective external component to the control circuit. For example, the respective figures of merit may be stored in a memory of the respective external electronic component.

In another embodiment of the present disclosure, selecting a combination of settings of the electronic components based on the performance parameters comprises choosing at least one of several measurement paths of the signal chain.

Accordingly, if the signal chain comprises several different measurement paths and if only one measurement path is needed for performing a desired measurement, the measurement path having the optimal at least one performance parameter may be selected.

If at least two measurement paths are necessary for performing the desired measurement, and if the desired measurement requires the measurement paths to have similar figures of merit, the at least two measurement paths may be selected such that the selected measurement paths have similar performance parameters.

If at least two measurement paths are necessary for performing the desired measurement, and if the desired measurement requires the measurement paths to have different figures of merit, the at least two measurement paths may be selected such that the selected measurement paths have different performance parameters.

Moreover, several measurement channels may be provided such that two or more signal can be measured at the same time. In some embodiments, a measurement channel relates to a port on the electronic device. A measurement channel may have several measurement paths which are internal settings, e.g. LO-Shifts, different intermediate frequencies, or bandwidth options.

Generally, the control circuit may select a measurement path with a superior performance.

In a multichannel device, the settings for the components in each measurement channel may be chosen according to a performance metric across different channels. The settings of one channel may depend on the settings of another channel.

Another aspect of the present disclosure provides that selecting a combination of settings of the electronic components based on the performance parameters determined for different combinations of settings of the components comprises, for example, automatically adapting the settings of the electronic components and/or displaying the selected settings of the electronic components on a display.

Thus, the control circuit may be configured to automatically set the electronic components according to the selected combination of settings.

Alternatively or additionally, the control circuit may be configured to provide information on the selected combination of settings to a user, namely by displaying the information on the selected combination of settings on a display, for example on a display of the electronic device. Thus, the user is prompted to set the respective electronic components based on the information provided, thereby reducing the time and expertise necessary for setting the components.

In some embodiments, the control circuit is configured to determine and/or receive a histogram of values of the signal of the signal chain, wherein the control circuit is configured to determine the at least one performance parameter based on the histogram. The histogram allows for a precise estimate of intermodulation distortion of each power value, which gives a better estimate of the impact of nonlinearities on the at least one performance parameter, for example on the SINAD.

Alternatively to the histogram, a fourth moment characteristic of the signal of the signal chain may be employed in order to determine the at least one performance parameter.

According to an aspect of the present disclosure, the electronic device, for example, is established as an oscilloscope, as a signal analyzer, as a vector network analyzer, as a spectrum analyzer, or as a signal generator. However, it is to be understood that the electronic device may be established as any other suitable electronic device, for example as any other suitable type of measurement instrument, depending on the respective measurements to be conducted. Further, the electronic device may be a signal generator.

In some embodiments, the electronic device may be a multi-channel device, and wherein the control circuit is configured to optimize a performance metric across several channels. Hence, the performance metric is not optimized for each channel individually. Actually, the performance metric is dependent on figures of merit and measurements of several channels. As discussed above, the settings for the components in each measurement channel may be chosen according to a performance metric across different channels. The settings of one channel may depend on the settings of another channel. Accordingly, some similarity between a figure of merit (distortion, noise, etc.) of the overall signal chains may exist.

Embodiments of the present disclosure further provide a method of configuring a signal chain by an electronic device. The signal chain comprises multiple electronic components, wherein the electronic components are integrated into the electronic device and/or are an external electronic component, respectively. In an embodiment, the configuration method comprises the steps of: receiving, by a control circuit of the electronic device, a set of figures of merit, wherein the set of figures of merit comprises at least one component-specific figure of merit for several different settings of several of the electronic components, respectively; determining and/or receiving, by the control circuit, at least one n-th moment characteristic of a signal of the signal chain; determining, by the control circuit, at least one performance parameter for a plurality of different combinations of settings of the electronic components, respectively, wherein the at least one performance parameter is indicative of a performance of the signal chain, and wherein the at least one performance parameter is determined based on the set of figures of merit and based on the at least one n-th moment characteristic; and selecting, by the control circuit, a combination of settings of the electronic components based on the performance parameters determined for different combinations of settings of the components.

In some embodiments, the electronic device described above is configured to perform the configuration method.

Regarding the further advantages and properties of the configuration method, reference is made to the explanations given above with respect to the electronic device, which also hold for the configuration method and vice versa.

According to an aspect of the present disclosure, the at least one performance parameter comprises, for example, a signal-to-noise and distortion ratio (SINAD) being associated with predetermined portions of the signal of the signal chain. In general, the predetermined portions of the signal that are taken into account for determining the at least one performance parameter may depend on the type of the measurement to be conducted by the signal chain, as described above.

According to an aspect of the present disclosure, the at least one figure of merit comprises, for example, at least one of a noise figure, a third order intercept, or a gain of the respective electronic component. However, it is to be understood that any other suitable figure of merit may be used.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows a measurement system with an electronic device according to a first embodiment of the present disclosure;

FIG. 2 schematically shows a measurement system with an electronic device according to a second embodiment of the present disclosure;

FIG. 4 shows a flow chart of a configuration method according to an embodiment of the present disclosure.

DETAILED DESCRIPTION

Figure 3:
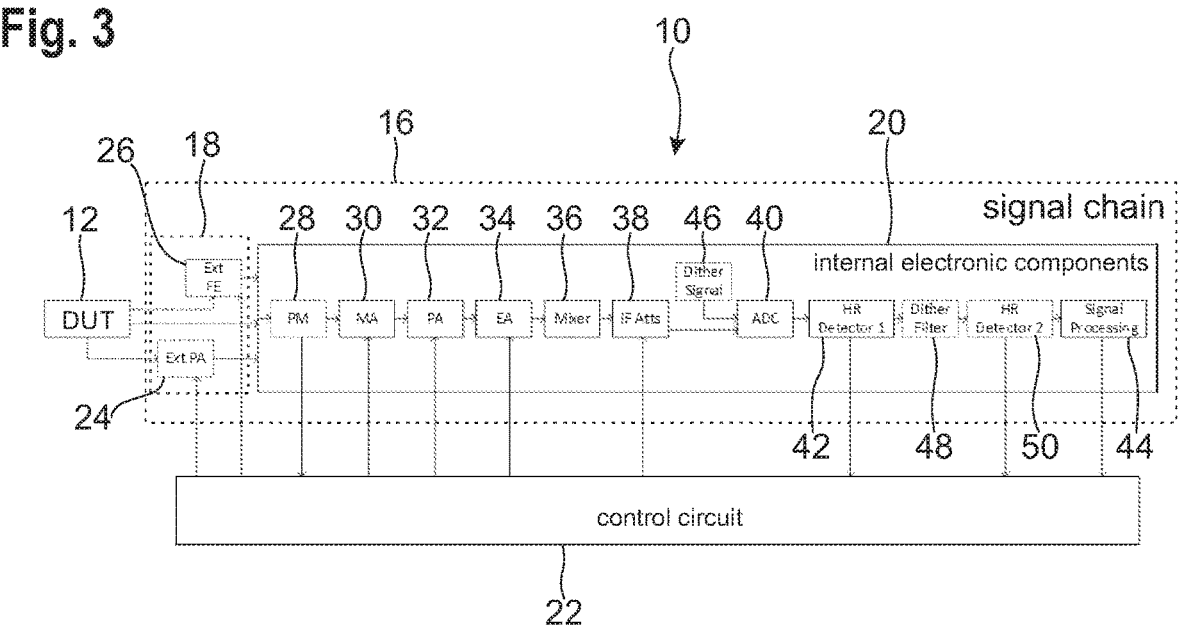
FIG. 3 schematically shows an example embodiment of the measurement system of FIG. 1.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

FIG. 1 schematically shows a measurement system 10 comprising a device under test 12, an electronic device 14, and a signal chain 16. The device under test 12 may be established as any electronic device being configured to generate and/or process a signal.

For example, the device under test 12 may be established as an amplifier, as a filter, as a mixer, as an analog-to-digital convert, as a digital-to-analog converter, as an RF frontend, or as a mobile communication device, for example as a mobile communication device being configured to communicate with other electronic devices via WLAN, LTE or 5G.

The electronic device 14 is established as any suitable type of measurement instrument being configured to perform measurements on a signal received from the device under test 12. For example, the electronic device 14 may be established as an oscilloscope, as a signal analyzer, as a vector network analyzer, or as a spectrum analyzer.

In general, the measurement system 10 is configured to assess a performance of the device under test 12 by performing suitable measurements on the device under test 12 by the electronic device 14 or by the signal chain 16, wherein the signal chain 16 is at least partially integrated into the electronic device 14. In some embodiments, the signal chain 16 comprises multiple electronic components that are connected to the device under test 12 in a signal-transmitting manner.

Therein and in the following, the term "connected in a signal transmitting manner" is understood to denote a cable-based or wireless connection that is configured to transmit signals between the respective devices or components In the embodiment shown in FIG. 1, the multiple electronic components comprise at least one external electronic component 18 that is established separately from the electronic device 14. The multiple electronic components further comprise at least one internal electronic component 20 that is integrated into the electronic device 14.

For example, the at least one external electronic component 18 may comprise an amplifier, a filter, for example a dither filter, a mixer, an analog-to-digital converter (ADC), a digital-to-analog converter (DAC), an RF frontend, a preamp, a mechanical attenuator, an electrical attenuator, a detector, and/or a signal generator.

Likewise, the at least one internal electronic component 20 may comprise an amplifier, a filter, for example a dither filter, a mixer, an analog-to-digital converter (ADC), a digital-to-analog converter (DAC), an RF frontend, a preamp, a mechanical attenuator, an electrical attenuator, a detector, and/or a signal generator.

However, it is to be understood that the multiple electronic components 18, 20 may comprise any other suitable electronic components, for example depending on the type of measurements to be conducted on the device under test 12.

The electronic device 14 further comprises a control circuit 22 that is connected at least to the internal electronic component(s) 20 in a signal transmitting manner. However, it is also conceivable that the control circuit 22 is connected to the external electronic component(s) 18 in a signal transmitting manner, for example via an additional port of the electronic device 14.

The functionality of the individual components of the measurement system 10, for example of the control circuit 22, will be described in more detail below.

The electronic device further comprises a display 23 that may be connected to the control circuit 22 in a signal-transmitting manner.

FIG. 2 shows another embodiment of the measurement system 10, wherein only the differences compared to the embodiment described above with reference to FIG. 1 are explained in the following.

In the embodiment shown in FIG. 2, the signal chain 16 is configured to provide a test signal to the device under test 12 in order to perform measurements on the device under test 12. Accordingly, the electronic device 14 may be established as a signal generator or the at least one internal electronic component 20 may comprise a signal generator.

Of course, it is also conceivable that the measurement system 10 may comprise several signal chains, for example a first signal chain transmitting a test signal to the device under test 12, and a second signal chain receiving and processing a signal received from the device under test 12, wherein the signal received from the device under test 12 corresponds to the test signal processed by the device under test 12.

In this case, the electronic device 14 may, for example, be established as a vector network analyzer.

FIG. 3 shows an example embodiment of the measurement system 10 shown in FIG. 1 in more detail.

In this embodiment, the external electronic components 18 comprise an external preamp 24 and an external front end 26 that are connected to the device under test 12, respectively. The internal electronic components 20 comprise a power meter 28, an mechanical attenuator 30, a preamp 32, an electrical attenuator 34, a mixer 36, one or several intermediate frequency (IF) attenuators 38, an analog-to-digital converter 40, a headroom detector 42, and a signal processing circuit 44.

Optionally, a dither signal source 46, a dither filter 48, and a second headroom detector 50 may be provided.

It is noted that the order of the internal electronic components 20, for example the order of the mechanical attenuator 30, the preamp 32, and the electrical attenuator 34, May be different from the order shown in FIG. 3. Likewise, any other suitable combination of electronic components 18, 20 may be provided in the signal chain 16.

The measurement system 10 or the electronic device 14 is configured to perform a method of configuring the signal chain 16, which is described in the following with reference to FIG. 4.

A set of figures of merit is received by the control circuit 22, wherein the set of figures of merit comprises at least one component-specific figure of merit for several different settings of several of the electronic components 18, 20, respectively, for example of all of the electronic components 18, 20 (step S1).

In general, the set of figures of merit may comprise a noise figure, a third order intercept, and/or a gain of the respective electronic components 18, 20, for example including their frequency dependency. However, it is to be understood that any other suitable figure of merit may be used.

The individual component-specific figures of merit may have been determined previously, for example by the manufacturer of the electronic device 14. For example, the set of figures of merit may at least partially be stored in a memory of the electronic device 14.

Alternatively or additionally, the electronic device 14 may comprise a user interface, wherein a user may input the set of figures of merit via the user interface, for example the figures of merit relating to the external electronic components 18.

At least one n-th moment characteristic of a signal of the signal chain 16 is determined and/or received by the control circuit 22 (step S2).

In some embodiments, at least the second moment characteristic may be determined and/or received, which corresponds to the power level of the signal of the signal chain 16.

Additionally, the fourth moment characteristic of the signal of the signal chain 16 may be determined.

Alternatively or additionally to the fourth moment characteristic, a histogram of values of the signal of the signal chain 16 may be determined and/or received by the control circuit 22.

At least one signal parameter of the signal of the signal chain 16 may be determined by a corresponding detector of the electronic device 14, wherein the at least one signal parameter is associated with at least one component-specific requirement of at least one of the electronic components 18, 20 (step S3).

In the particular example shown in FIG. 3, the at least one signal parameter may be a headroom of the ADC 40 that is determined by the headroom detector 42.

In some embodiments, the headroom of the ADC 40 may be determined with enhanced precision by the headroom detector 42 in cooperation with the dither signal source 46, the dither filter 48, and the second headroom detector 50.

As further examples, the at least one signal parameter may comprise a headroom of a digital-to-analog converter, a saturation of an analog-to-digital converter, a saturation of a digital-to-analog converter, an overload of an analog-to-digital converter, and/or an overload of a digital-to-analog converter.

However, it is to be understood that the at least one signal parameter may relate to any other component-specific requirement.

A bandwidth of the signal of the signal chain 16 is determined and/or received by the control circuit 22 (step S4).

Thus, the electronic device 14 or the control circuit 22 may be configured to estimate a bandwidth of the signal of the signal chain 16.

Alternatively or additionally, a user may input the bandwidth of the signal of the signal chain 16 via the user interface of the electronic device 14.

At least one performance parameter is determined by the control circuit 22 based on the set of figures of merit, the at least one n-th moment characteristic, the bandwidth of the signal of the signal chain 16, and, optionally, based on the histogram and/or the at least one signal parameter (step S5).

In some embodiments, the at least one performance parameter is determined for a plurality of different combinations of settings of the electronic components 18, 20, respectively, for example for all possible combinations.

In general, the at least one performance parameter is indicative of a performance of the signal chain 16, namely indicative of unwanted influences of the electronic components 18, 20 on measurements conducted by the signal chain 16.

In some embodiments, the at least one performance parameter comprises a signal-to-noise and distortion ratio (SINAD) being associated with predetermined portions of the signal of the signal chain 16.

Knowing the bandwidth of the signal, the at least one n-th moment characteristic, and the individual component-specific figures of merit, textbook formulas can be used to estimate or determine the SINAD.

Therein, the formulas may correspond to a mathematical model of the SINAD of the signal chain 16.

If unwanted contributions of the electronic components to the EVM are to be reduced, the complete signal of the signal chain may be taken into account. This way, the determined SINAD is indicative of the contribution of the signal chain to the EVM.

As another example, if unwanted contributions of the electronic components to the ACLR are to be reduced, only shoulder portions of the signal of the signal chain may be taken into account, for example wherein a number of carriers, a carrier distance, and/or a modulation scheme (such as OFDM) may be taken into account. This way, the determined SINAD is indicative of the contribution of the signal chain 16 to the ACLR.

Optionally, if the signal chain 16 is configured to apply a noise reduction technique to the signal of the signal chain 16, the control circuit 22 may take the noise reduction into account for determining the at least one performance parameter.

For example, figures of merit other than the total noise figure of the individual electronic components 18, 20 may be weighted with a greater weighting factor if a noise reduction technique is applied to the signal of the signal chain 16.

Optionally, if the signal chain 16 is configured to apply an equalization technique to the signal of the signal chain 16, the control circuit 22 may take the equalization technique into account for determining the at least one performance parameter.

Therein, the equalization technique may relate to pre-compensating non-linearities and/or post-compensating non-linearities of the electronic components 18, 20 by a corresponding equalizer filter circuit.

A combination of settings of the electronic components 18, 20 is selected by the control circuit 22 based on the performance parameters determined for different combinations of settings of the electronic components (step S6).

In general, the selected combination of settings corresponds to settings of the electronic components 18, 20 of the signal chain 16 that optimize the performance of the signal chain 16.

In other words, the selected combination of settings corresponds to settings of the electronic components 18, 20 of the signal chain 16 that minimize the contribution of the electronic components 18, 20 to the EVM and/or the ACLR.

If only one performance parameter is determined, an optimal combination of settings of the electronic components 18, 20 can be selected by selecting the combination having an optimal (i.e. maximal or minimal) performance parameter.

If at least two performance parameters are determined, an optimal combination of settings of the electronic components 18, 20 can be selected by weighting the at least two performance parameters with a suitable weighting factor, wherein the weighting factor may depend on the measurement to be conducted.

In some embodiments, the step of selecting the combination of settings may comprise enabling a noise reduction technique applied by the signal chain 16 or disabling the noise reduction technique.

As another example, the step of selecting the combination of settings may comprise choosing at least one of several measurement paths of the signal chain 16.

Accordingly, if the signal chain 16 comprises several different measurement paths and if only one measurement path is needed for performing a desired measurement, the measurement path having the optimal at least one performance parameter may be selected.

If at least two measurement paths are necessary for performing the desired measurement, and if the desired measurement requires the measurement paths to have similar figures of merit, the at least two measurement paths may be selected such that the selected measurement paths have similar performance parameters.

If at least two measurement paths are necessary for performing the desired measurement, and if the desired measurement requires the measurement paths to have different figures of merit, the at least two measurement paths may be selected such that the selected measurement paths have different performance parameters.

The selected combination of settings may comprise at least one of a mechanical attenuator setting, an electrical attenuator setting, a preamp setting, an IF attenuator setting, a used bandwidth option (with noise reduction enabled or not), a signal bandwidth, a signal level, and or an amplitude distribution (e.g. Crest factor and/or PAPR).

The selected combination of settings is automatically set by the control circuit 22 and/or is displayed on the display 23 (step S7).

Accordingly, the settings of the electronic components 18, 20 may be automatically adapted according to the selected combination of settings.

Alternatively or additionally, information on the selected combination of settings is provided to a user, namely by displaying the information on the selected combination of settings on the display 23.

It is noted that it is also conceivable that the settings of the signal chain 16 or of the electronic components 18, 20 are adapted iteratively.

Thus, steps S1 to S7 described above may be performed a first time, thereby obtaining and setting preliminary settings of the electronic components 18, 20.

With the obtained preliminary settings, steps S1 to S7 may be repeated, thereby obtaining and setting adapted settings of the electronic components 18, 20.

The steps S1 to S7 may be repeated until an abort criterion is met, e.g. a maximum number of iterations or a sufficient convergence of the settings of the electronic components 18, 20 (i.e. the settings differ by less than a predetermined threshold between two consecutive iterations of steps S1 to S7).

Determination of a Figure of Merit

In general, a figure of merit of at least one component under test can be determined as described hereinafter. The at least one component under test may be within a signal chain having several components, wherein the signal chain is an internal and/or external signal chain, which means that the several components may be internal and/or external components.

An overall figure of merit of the signal chain may be determined, for instance by applying a measurement signal to an input port of the signal chain. However, in case of a noise figure measurement, it is not necessary to apply a measurement signal.

Further, the overall figure of merit of the signal chain is repeatedly determined while altering at least one setting of one of the several components of the signal chain per repetition, wherein the overall figure of merit of the signal chain is determined for each repetition, and wherein the at least one setting is altered such that the contribution of the respective component under test is dominant to the overall figure of merit of the signal chain with respect to contributions of remaining components of the signal chain. Put differently, the level of dominance of the contribution of the respective component under test can be increased relative to contributions of different components of the signal chain. The contribution of the component under test may be more prominent as compared to contributions of different components.

Depending on the degree of dominance, the contribution of the respective component under test to the overall figure of merit of the signal chain may be isolated with respect to contributions of remaining components of the signal chain.

Based on this modification procedure, the component under test may be precisely characterized with regard to its (electronic) properties without any structural changes to the signal chain. For example, in case of an attenuator or amplifier, a gain setting could be altered upon repetitions. As a consequence, the contribution of the respective component under test is increased with regard to remaining components of the signal chain. This allows to extract the contribution of the component from the overall figure of merit. Hence, the expenses for characterizing components of a signal chain are greatly reduced. Also, the time period needed to characterize several components of the signal chain is significantly reduced since structural changes to the signal chain may be avoided.

Accordingly, the properties of the individual component within the signal chain can be determined without any modification to the signal chain per se.

In some embodiments, a respective contribution to the figure of merit is determined for several (multiple) components under test of the signal chain by repeatedly capturing the measurement signal at the port of the signal chain while altering at least one setting of one of the several components under test of the signal chain per repetition. Put differently, the method may be repeated in view of several or every single component under test comprised within the signal chain. This allows to characterize even the entire signal chain with regard to its properties, for example each component under test of the signal chain individually.

Optionally, the at least one setting is modified at least such that for each of the components under test of the signal chain at least one component-dependent specific requirement is met at least once. Therefore, the characterization procedure may be better defined since the component specific requirements may ensure that specific conditions are met. For example, a signal-to-noise ratio above a certain threshold value may be guaranteed at least once for every component under test of the signal chain based on an alteration of the settings of the component under test. This allows nonlinearities and noise caused by the component under test to be comparable to values determined for other components of the signal chain. In other words, the component-dependent specific requirements guarantee a comparableness of the determined (electronic) properties in view of the (electronic) properties determined for other components of the signal chain.

In some embodiments, upon repetitions, the at least one setting is modified at least such that for each of the components under test of the signal chain an intermodulation product exceeds a component-specific threshold value relative to ground noise at least once. Here, intermodulation (IM) may be considered the amplitude modulation of signals containing two or more different frequencies, caused by nonlinearities or time variance in a system. By ensuring that the IM product exceeds the threshold value which itself is determined relative to ground noise, a specific signal quality is guaranteed. More particularly, a desired signal-to-noise ration may be guaranteed. As a consequence, the characterization of the (electronic) properties of the component under test can be performed with higher precision.

Optionally, at least one user interface is provided. For example, the user interface may be connected to a determination circuit. Based on the user interface several information may be provided to a user or commands may be received via the user interface such that the method may be tailored.

In some embodiments, the overall figure of merit of the signal chain and/or a figure of merit of a single or several components under test and/or the contribution of individual components to the overall figure of merit is provided via the user interface. Hence, the comfort for the user is greatly improved.

Optionally, at least one external component is added to the signal chain via the user interface and/or the signal chain is defined via the user interface. Thereby, additional possibilities are provided for a user to tailor the method as desired.

In some embodiments, the at least one setting is altered via the user interface and/or a state of the signal chain is switched during subsequent repetitions via the user interface and/or or a user is prompted via the user interface to change a state of a signal of the at least one external component. Put differently, based on the user interface specific commands may be received so as to define settings of components of the signal chain. In an alternative, specific requests may be prompted via a user interface for improving the method. Accordingly, a user may directly influence the method as desired.

In some embodiments, the figure of merit is at least one of a noise figure (NF), a third order intercept (TOI), a gain, and an attenuation. The TOI may be considered to represent the nonlinearities caused by a component under test to the signal transmitted through the signal chain. Accordingly, the component under test may be precisely characterized with regard to its (electronic) properties being of interest, such as a gain or attenuation as well.

In telecommunications, a TOI point is a specific figure of merit associated with the more general third-order IM distortion, which is a measure for weakly nonlinear systems and devices, for example receivers, linear amplifiers and mixers. It is based on the idea that the device nonlinearity can be modeled using a low-order polynomial, derived by means of Taylor series expansion. The TOI point relates nonlinear products caused by the third-order nonlinear term to the linearly amplified signal. Hence, the TOI may be used to identify an (unwanted) influence of the respective component under test onto a transmitted signal. Of course there are influences onto the signal which are specifically wanted such as attenuating or amplifying. What is meant here is a generally unwanted influence on the signal quality per se.

In some embodiments, the figure of merit is measured at an analog-to-digital converter that is part of the signal chain. Considering the analog-to-digital converter guarantees that the signal properties are detected with high resolution as the gain of the analog-to-digital converter may be appropriately adjusted.

Optionally, the TOI may be measured by inserting a dual tone signal at an input port of the signal chain while measuring the power of the continuous waves and the intermodulation products with the ADC.

In some embodiments, the NF is measured by either applying no signal at all to the port, by switching the input port to a defined resister, by applying a defined resister to the port, or by applying a noise source with known noise power. The noise power may then be measured via the analog-to-digital converter.

In this regard, initially, the measurement system can only capture the total NF and total TOI of the complete signal chain. By changing the parameters of the components under test comprised within the chain (e.g. preamp stages or gains, attenuator settings) different operating points of the respective components under test can be evaluated. As a consequence, applying an algorithm, the NF and TOI of each component under test of the signal chain may be determined based on a respective equation system. The equation system comprises formulas which relate the impact of the TOI and NF of each component under test of the signal chain to the total measured NF and TOI in dependence of the configuration of the components, i.e. in dependence of the respective settings of the component under test. The repetition of capturing the measurement signal while altering the settings of the component under test then provides different measured signals at the output of the signal chain, where the contribution of the component under test may be extrapolated based on the equation system. We again note that no specific measurement signal may necessarily be captured as also the entire evaluation procedure may also be based on purely capturing respective noise signals upon a variation of the settings of the component(s) under test.

More specifically, the TOI of a signal chain comprising devices having respective TOIs, here denoted as Ip3i,xx (in dB), and with gains gi (in dB) may be determined via the following:

$$[IP3]\_(i, tot) =$$
$$-10 \cdot \log_{10}(10^{\wedge}([IP3]\_(i, 1)/10) + 10^{\wedge}([g\_1 - IP3]\_(i, 2)/10) +$$
$$10^{\wedge}((g\_1 + g\_2 [-IP3] I(i, 3))/10) + \cdots)$$

Here, IP3i,tot denotes the total TOI of the signal chain, i denotes a respective component.

The NF of a system having n components may be determined via the following:

$$F\_ges = F\_1 + (F\_2 - 1)/G\_1 +$$
$$(F\_3 - 1)/(G\_1 \ G\_2) + \cdots + (F\_n - 1)/(\prod\_(i = 1)^{\wedge}(n - 1) G\_i)$$

Here, Fi denotes the NF of a specific component i, Gi denotes the gain of a respective component i, and Fges denotes the total NF of the signal chain respectively measured.

In some embodiments, a sensitivity of the contribution of the respective component under test to at least one of the overall figure of merit, a third order intercept point (TOI point), a noise figure, and a different figure of merit of the signal chain is determined. The sensitivity gives information about a reliability of identifying the contribution of the respective component under test to the at least one of the overall figure of merit, the third order intercept point, the noise figure, and the different figure of merit when capturing the measurement signal in view of the component's settings. Put differently, the sensitivity represents a confidence level with regard to the determined contribution in view of a specific component under test.

In some embodiments, the component's settings are modified upon repetitions of capturing the measurement signal if the sensitivity is below a predetermined threshold value. Put differently, a sensitivity which is below the predetermined threshold value may indicate that the confidence is too low to be trusted. Hence, the component's settings may be altered and a repeated measurement signal may be subsequently captured so as to acquire an increased sensitivity level, preferably a sensitivity which exceeds the predetermined threshold value.

In some embodiments, an output signal is output in case the sensitivity determined is low, wherein the output signal is a notification informing a user about the low sensitivity or a control signal that alters the at least one setting and initializes capturing of an additional measurement signal. Since a low sensitivity indicates that the confidence with regard to a determined contribution of a component under test is low, the user can thus be informed about this fact. This provides the user with the possibility to alter the measurement method so as to characterize the component under test with higher sensitivity, e.g., if specific settings for the component under test are applied.

Optionally, the sensitivity determined is output via a user interface. Thus, the user is directly informed about how reliable the characterization of the component under test is to be considered.

In some embodiments, limits for the sensitivity are input via a user interface. This provides the possibility to automatically alter the settings for a component under test until the determined contribution of the respective component under test is determined with a sensitivity meeting the limits received via the user interface.

In some embodiments, a figure of merit of an external component or a contribution of the external component to the overall figure of merit is input via user interface or a database. It may be that specific components of the signal chain have been characterized with regard to their (electronic) properties before. Accordingly, such information can be made use of. This allows the measurement method to be sped up.

Certain embodiments disclosed herein include components, a control circuit 22, a signal processing circuit 44, etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry." "circuit." "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, the circuitry described above can include one or more computer-readable media containing computer readable instructions embodied thereon that, when executed by the one or more computer circuits, sometimes referred to as computing devices, cause the one or more computer circuits to perform one or more steps of any of the methods described herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An electronic device for improving a performance of a signal chain, wherein the signal chain comprises multiple electronic components, and wherein the electronic components are integrated into the electronic device and/or are an external electronic component, respectively,
   wherein the electronic device comprises a control circuit,
   wherein the control circuit is configured to receive a set of figures of merit, wherein the set of figures of merit comprises at least one component-specific figure of merit for several different settings of several of the electronic components, respectively,
   wherein the control circuit is configured to determine and/or receive at least one n-th moment characteristic of a signal of the signal chain,
   wherein the control circuit is configured to determine at least one performance parameter for a plurality of different combinations of settings of the electronic components, respectively, wherein the at least one performance parameter is indicative of a performance of the signal chain,
   wherein the control circuit is configured to determine the at least one performance parameter based on the set of figures of merit and based on the at least one n-th moment characteristic, and
   wherein the control circuit is configured to select a combination of settings of the electronic components based on the performance parameters determined for different combinations of settings of the electronic components.

2. The electronic device of claim 1, wherein the at least one performance parameter comprises a signal-to-noise and distortion ratio (SINAD) being associated with predetermined portions of the signal of the signal chain.

3. The electronic device of claim 1, wherein the control circuit is configured to neglect predetermined portions of the signal of the signal chain for determining the at least one performance parameter.

4. The electronic device of claim 1, wherein the control circuit is configured to adapt the n-th moment used for determining the at least one performance parameter.

5. The electronic device of claim 1, wherein the at least one figure of merit comprises at least one of a noise figure, a third order intercept, or a gain of the respective electronic component.

6. The electronic device of claim 1, wherein the electronic device comprises a detector being configured to determine at least one signal parameter of the signal of the signal chain, wherein the at least one signal parameter is associated with at least one component-specific requirement of at least one of the electronic components, and wherein the control circuit is configured to take the at least one signal parameter into account for determining the at least one performance parameter.

7. The electronic device of claim 6, wherein the at least one signal parameter comprises a headroom of an analog-to-digital converter, a headroom of a digital-to-analog converter, a saturation of an analog-to-digital converter, a saturation of a digital-to-analog converter, an overload of an analog-to-digital converter, and/or an overload of a digital-to-analog converter.

8. The electronic device according to claim 1, wherein the electronic device is configured to determine signal performance metrics, and wherein the control circuit is configured to take the signal performance metrics into account for determining the at least one performance parameter.

9. The electronic device according to claim 1, wherein the electronic device is configured to estimate a bandwidth of the signal of the signal chain, and/or wherein the electronic device comprises a user interface that is configured to receive the bandwidth from a user.

10. The electronic device of claim 9, wherein the control circuit is configured to determine the at least one performance parameter based on the bandwidth.

11. The electronic device of claim 1, wherein the control circuit is configured to take a noise reduction technique applied to the signal of the signal chain into account for determining the at least one performance parameter.

12. The electronic device of claim 11, wherein selecting a combination of settings of the electronic components based on the performance parameters comprises configuring the noise reduction technique.

13. The electronic device of claim 1, wherein the control circuit is configured to take an equalization technique applied to the signal of the signal chain into account for determining the at least one performance parameter, wherein the equalization technique is a technique for compensating non-linearities of the electronic components.

14. The electronic device of claim 1, wherein the electronic device comprises a user interface, wherein the user interface is configured to receive the at least one figure of merit of external electronic components of the signal chain from a user.

15. The electronic device of claim 1, wherein selecting a combination of settings of the electronic components based on the performance parameters comprises choosing at least one of several measurement paths of the signal chain.

16. The electronic device of claim 1, wherein selecting a combination of settings of the electronic components based on the performance parameters determined for different combinations of settings of the components comprises automatically adapting the settings of the electronic components and/or displaying the selected settings of the electronic components on a display.

17. The electronic device of claim 1, wherein the control circuit is configured to determine and/or receive a histogram of values of the signal of the signal chain, and wherein the control circuit is configured to determine the at least one performance parameter based on the histogram.

18. The electronic device of claim 1, wherein the electronic device is established as an oscilloscope, as a signal analyzer, as a vector network analyzer, as a spectrum analyzer, or as a signal generator.

19. The electronic device of claim 1, wherein the electronic device is a multi-channel device, and wherein the control circuit is configured to optimize a performance metric across several channels.

20. A configuration method of configuring a signal chain by an electronic device, the signal chain comprising multiple electronic components, and wherein the electronic components are integrated into the electronic device and/or are an external electronic component, respectively, the configuration method comprising the steps of:
   receiving, by a control circuit of the electronic device, a set of figures of merit, wherein the set of figures of merit comprises at least one component-specific figure of merit for several different settings of several of the electronic components, respectively;
   determining and/or receiving, by the control circuit, at least one n-th moment characteristic of a signal of the signal chain;
   determining, by the control circuit, at least one performance parameter for a plurality of different combinations of settings of the electronic components, respectively, wherein the at least one performance parameter is indicative of a performance of the signal chain, and wherein the at least one performance parameter is determined based on the set of figures of merit and based on the at least one n-th moment characteristic; and
   selecting, by the control circuit, a combination of settings of the electronic components based on the performance parameters determined for different combinations of settings of the components.

21. The configuration method of claim 20, wherein the at least one performance parameter comprises a signal-to-noise and distortion ratio (SINAD) being associated with predetermined portions of the signal of the signal chain.

22. The configuration method of claim 20, wherein the at least one figure of merit comprises at least one of a noise figure, a third order intercept, or a gain of the respective electronic component.

* * * * *